United States Patent [19]

Uchishiba et al.

[11] Patent Number: 5,315,500
[45] Date of Patent: May 24, 1994

[54] DIAGNOSTIC SYSTEM AND METHOD FOR DETECTING RETARDATION OF AN OBJECT CONTROLLED BY A PROGRAMMABLE CONTROLLER

[75] Inventors: Izumi Uchishiba; Kathuhito Kawai; Shinji Kogure, all of Toyota, Japan

[73] Assignee: Toyota Jidosha Kabushiki Kaisha, Aichi, Japan

[21] Appl. No.: 828,177

[22] Filed: Jan. 30, 1992

[30] Foreign Application Priority Data

Mar. 14, 1991 [JP] Japan .................................. 3-49374

[51] Int. Cl.$^5$ ............................................ G05B 11/01
[52] U.S. Cl. ................................... 364/183; 371/15.1; 364/265.5; 364/DIG. 1
[58] Field of Search ............................... 364/183–187, 364/264–269.4, 943.9; 395/575; 371/15.1, 16.5, 17, 20.1, 20.4, 24, 25.1, 26, 29.1

[56] References Cited

U.S. PATENT DOCUMENTS

| 3,997,879 | 12/1976 | Markley et al. | 364/200 |
| 4,086,658 | 4/1979 | Finlay | 364/900 |
| 4,254,473 | 3/1981 | Galdun et al. | 364/900 |
| 4,870,644 | 9/1989 | Sherry et al. | 371/29.1 |
| 5,140,686 | 8/1992 | Cox et al. | 371/15.1 |

FOREIGN PATENT DOCUMENTS

| 0148951A1 | 7/1985 | European Pat. Off. |
| 57-132207 | 8/1982 | Japan . |
| 61-202207 | 9/1986 | Japan . |
| 3-22198 | 1/1991 | Japan . |
| 3-29481 | 2/1991 | Japan . |
| 2029986A | 3/1980 | United Kingdom . |

Primary Examiner—Jerry Smith
Assistant Examiner—Jim Trammell

[57] ABSTRACT

A diagnostic system and method for detecting retardation of a object controlled by a programmable controller. The system may include a microprocessor system with a keyboard, a printer, a memory card, and a telecommunications line which is connected to one or more programmable controllers. This system reads operational commands and signals, representing the completion of an operation, through the telecommunications line. If any retardation occurs, the diagnostic system fetches a series of operation commands, and identifies the logical address where retardation occurs.

10 Claims, 8 Drawing Sheets

Fig. 2

| STEP | OUTPUT ADDRESS FOR OPERATIONAL COMMAND | INPUT ADDRESS FOR SIGNAL REPRESENTING THE COMPLETION OF OPERATION | STATUS FLAG |
|---|---|---|---|
| 1 | 1100 | 0021 | 1 |
| 2 | 1101 | 0023 | 1 |
| 3 | 1102 | 0024 | 0 |
| 4 | 1104 | 0025 | 0 |
| 5 | | | |

201 / 202 / 203

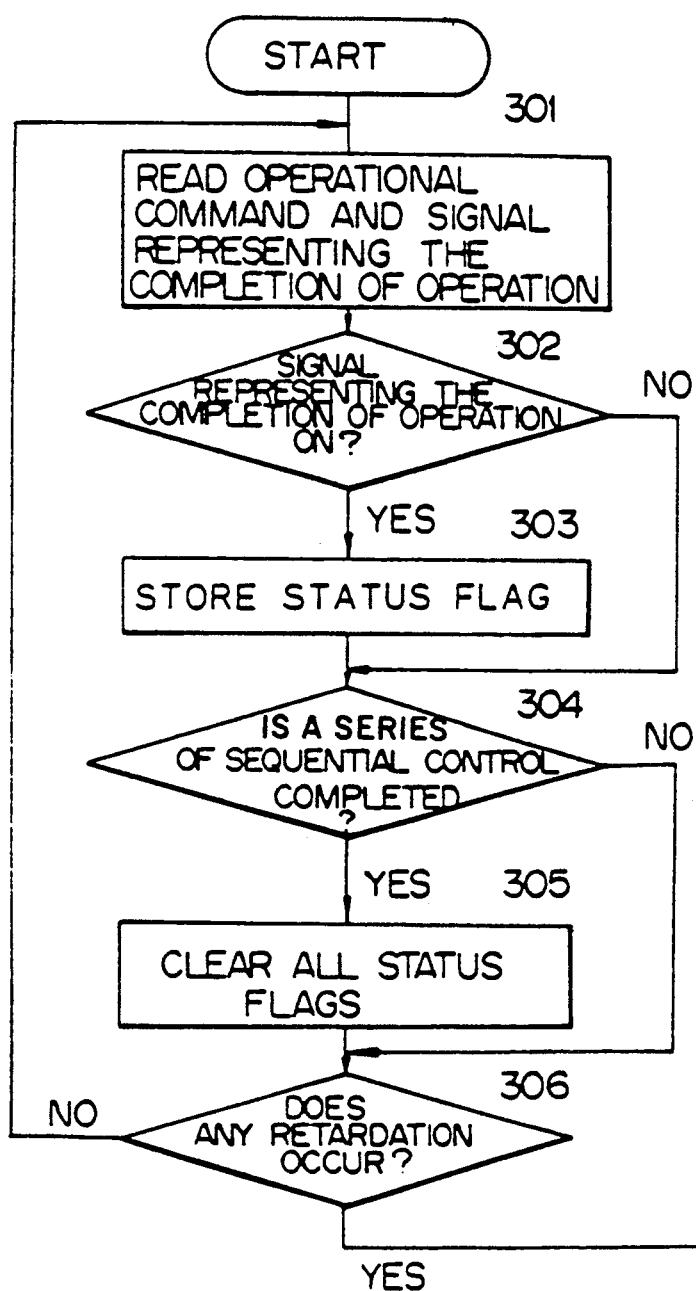

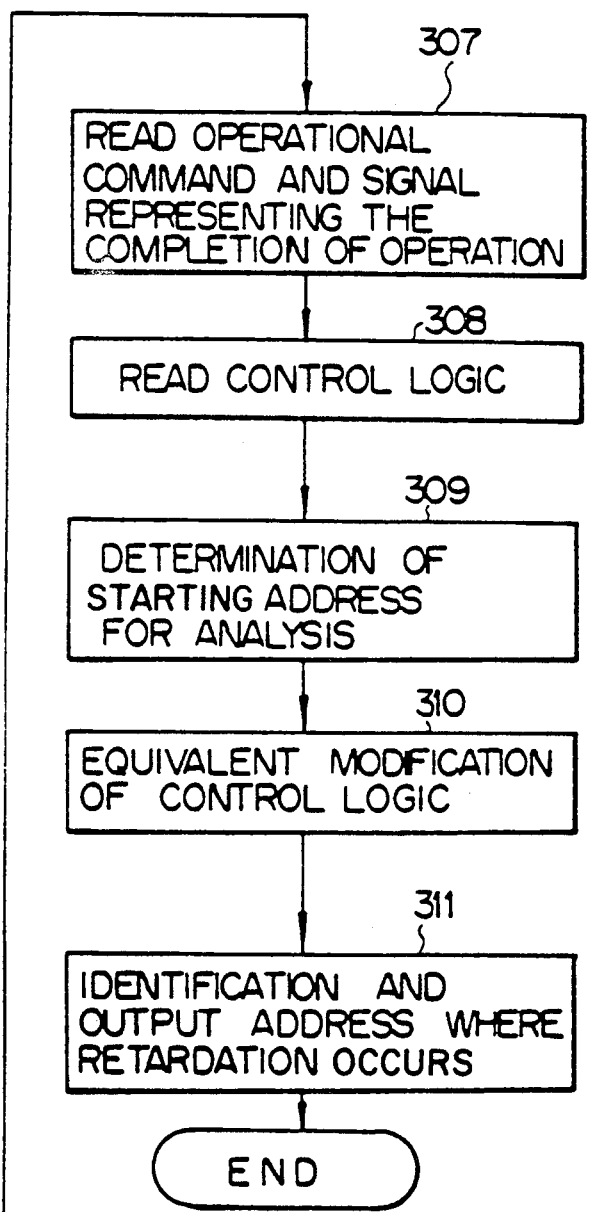

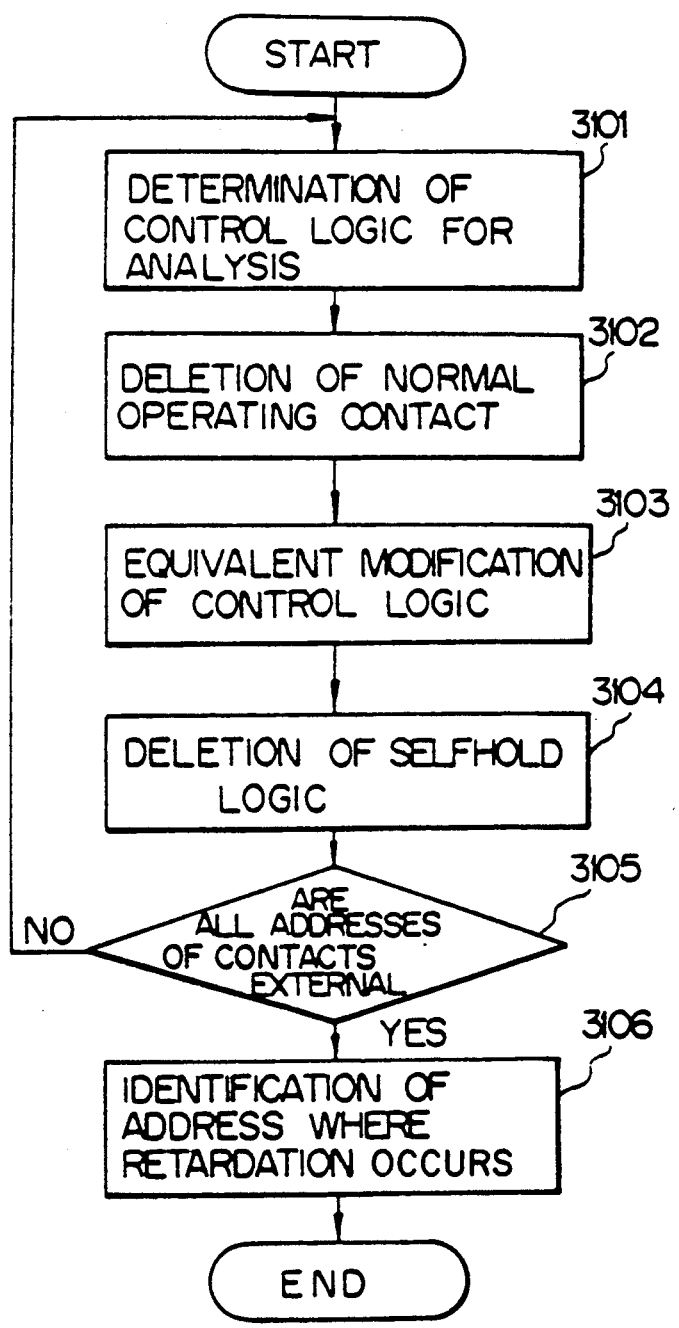

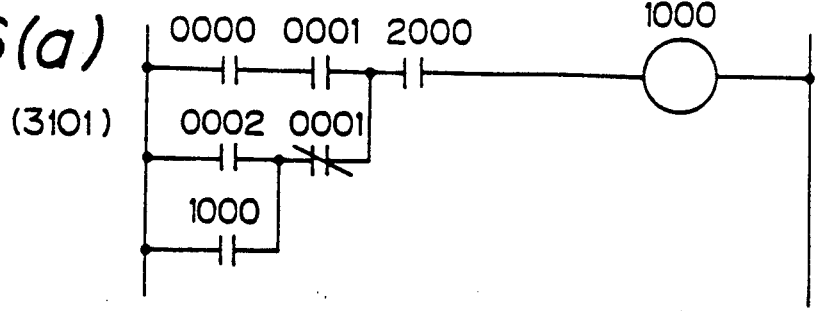
Fig.6(a) (3101)
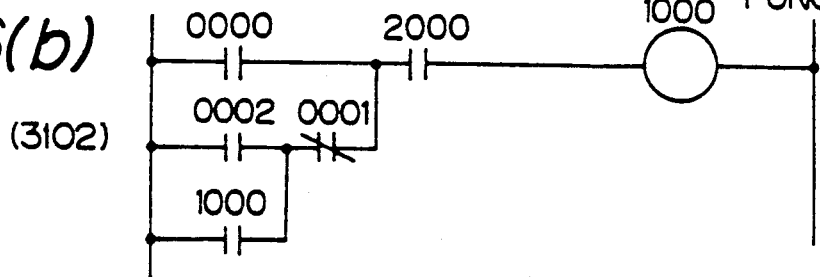
Fig.6(b) (3102)
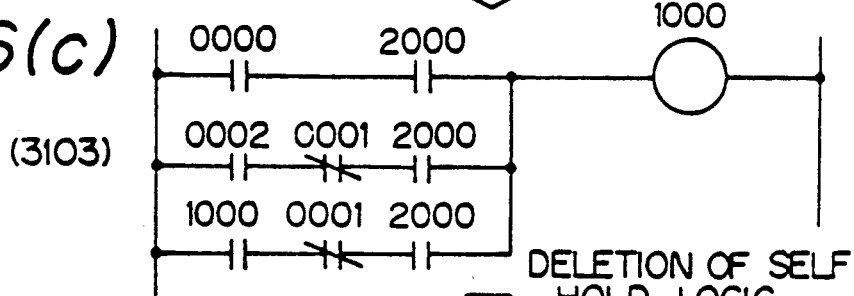
Fig.6(c) (3103)
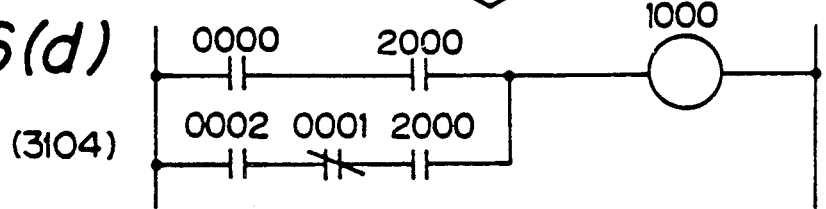
Fig.6(d) (3104)

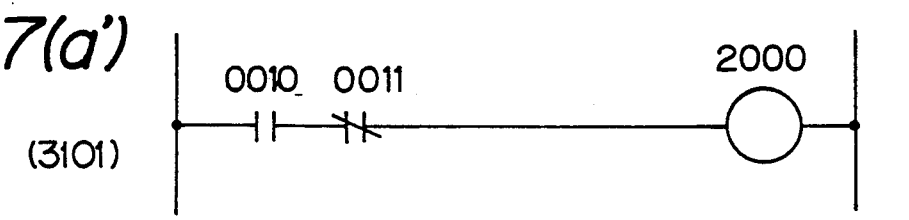
Fig. 7(a')
(3101)
⇩ DELETION OF "b" CONTACT OF "0001" AS IT NORMALLY FUNCTIONS
Fig. 7(b')
(3102)
FROM (d)
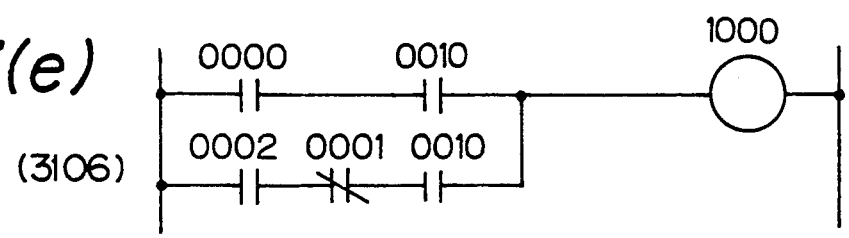
Fig. 7(e)
(3106)

DIAGNOSTIC SYSTEM AND METHOD FOR DETECTING RETARDATION OF AN OBJECT CONTROLLED BY A PROGRAMMABLE CONTROLLER

BACKGROUND OF THE INVENTION

1. Field of the Invention

The present invention relates to a diagnostic system for a programmable controller (hereinafter referred to as PC), and more particularly to a diagnostic system enabling the identification of logical addresses where retardations occur during a series of sequential control proceedings.

2. Description of the Related Art

PC's are widely used for controlling a various kinds of controlled objects sequentially with a programmed order.

PC's apply operational commands to actuators such as motors, solenoid valves, etc arranged on various kinds of controlled objects, and output operational commands when PC's sense signals representing the completion of operations output from sensors, such as limit switches for controlling various kinds of controlled objects sequentially with a programmed order.

And if a retardation should occur during a sequential controller proceeding, actions of various kinds of controlled objects are interrupted.

In PC's, however, because many actuators and sensors are connected to PC's, it requires a long time and special knowledge of PC's to determine the cause of a retardation and identify a logical address corresponding to abnormal actuators and sensors.

To simplify an inspection and an identification, PC's with so-called diagnostic function are already suggested (see Japanese Unexamined Patent Application (Kokai) 61-202207).

ON-OFF statuses of contacts arranged on a controlled object are read in this PC synchronizing each sampling time, and logical addresses corresponding to abnormal actuators and sensors are identified by comparing the ON-OFF statuses with a preprogrammed status representing a normal condition.

Therefore, this PC has the following faults.

(1) ON-OFF statuses representing a normal condition must be preprogrammed.

(2) A diagnostic area is limited by capacity of memory which stores an ON-OFF status representing a normal condition and an actual ON-OFF status.

(3) When control logics are modified, modifications for a diagnostic area and diagnostic logic are required.

SUMMARY OF THE INVENTION

Therefore, an object of the present invention is to provide a diagnostic system enabling the identification of a logical address where a retardation occurs during a sequential control proceeding.

According to this invention, this diagnostic system can diagnose all input points and output points, and can deal with a modification of control logics.

BRIEF DESCRIPTION OF THE DRAWINGS

The present invention will be more clearly understood from the description set forth below with reference to the accompanying drawings.

FIG. 2 is a schematic diagram showing data stored in the memory.

FIG. 3 is a flow chart showing the diagnosis of the diagnostic system.

FIG. 5 is a flow chart showing the equivalent modification of the control logics.

FIGS. 6a-6d are examples control logic modified by the equivalent modification (½).

FIG. 7a-7c are examples control logic modified by the equivalent modification (2/2).

DESCRIPTION OF THE PREFERRED EMBODIMENTS

Figure 1:
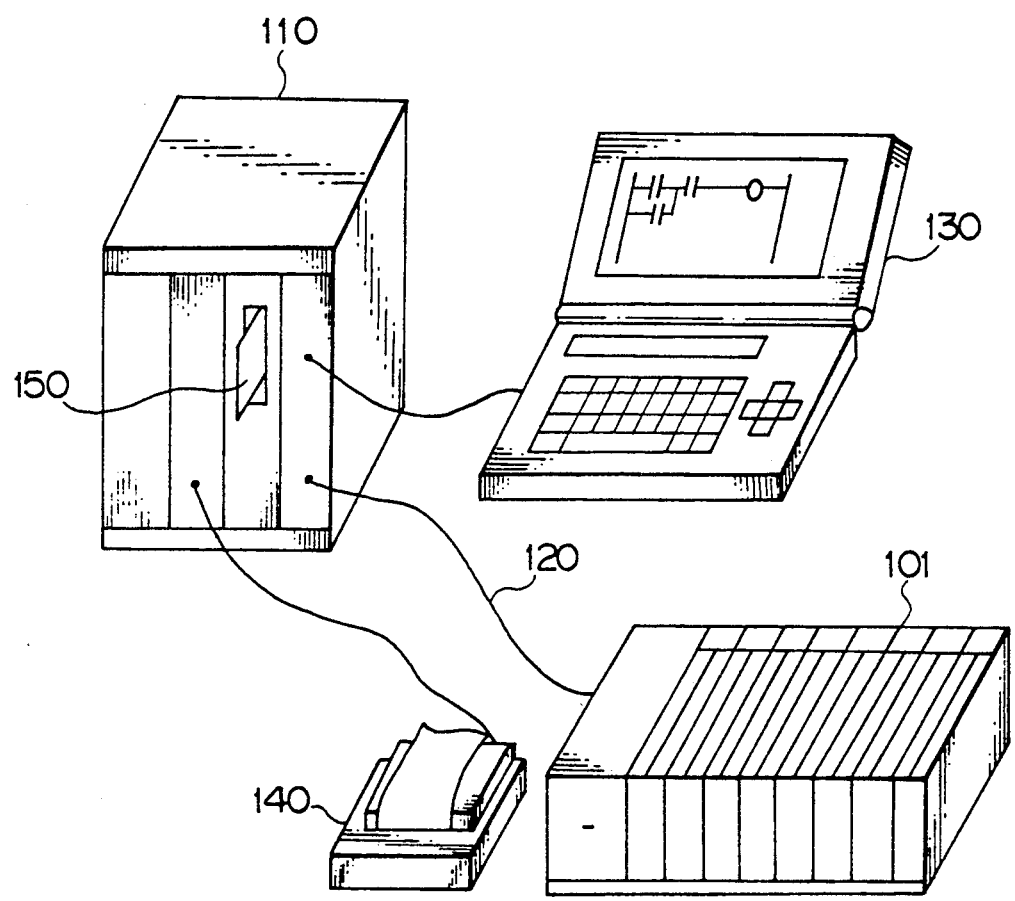
FIG. 1 is a hardware construction of a diagnostic system according to this invention.

In FIG. 1, which illustrates s hardware construction of the diagnostic system according to the present invention, the diagnostic system consists of a so-called microprocessor system.

PC 101 performs the sequential control for the controlled object (not show), and is connected to the diagnostic system 110 with a telecommunication line 120 such as RS232C or RS422.

Input means 130, such as a keyboard, for inputting a command, and output means 140, such as a printer, for outputting the analysis result, are connected to this diagnostic system 110.

Memory means 150, such as an IC-card, stores output addresses of the operational commands, input addresses of the signals representing the completion of the operations, and status flags of the completion of the operations.

FIG. 2 shows status of data stored in memory means 150, and the output addresses of the operational commands 201 and input address of the signals representing the completion of the operations 202 determined at the same time as the input and output addresses of the PC are assigned, are also provided.

Status flags 203 are inverted, for example from "0" to "1" when the signal representing the completion of the operation is received by a PC corresponding to the operational command.

FIG. 3 is a flow chart showing the diagnostic routine executed in the diagnostic system 110 synchronized with the sequential control performed by PC 101.

At step 301, the operational command for the controlled object (not shown) output from PC 101, and the signal representing the completion of the operation sent to PC 101 from the controlled object, are read into the diagnostic system 110 through the telecommunication line 120.

At step 302, it is determined whether the signal representing the completion of the operation, corresponding to the operational command, is fed back or not.

At step 303, when this signal is received by a PC, the status flag is positioned at the address corresponding to the operational command thereof.

If this signal is not fed back to a PC, or step 303 is completed, the control proceeds to step 304.

At step 304, it is determined whether a series of sequential controls are completed or not.

When a series of sequential control is completed, all status flags are stored in memory means 250 at step 305, and the diagnostic system goes to stand-by mode for the next series of sequential controls.

After it is determined that a series of sequential control is not completed at step 304, or all status flags are cleared, the control proceeds to step 306, where it is determined whether any retardation has occurred or not.

If no retardation has occurred, the control returns to step 301. And if retardation is found, the diagnostic analysis is started.

The command for starting the diagnostic analysis can be given from the input means 130, for example, a personal computer by the operator of the controlled object.

And this command can be automatically given by a so-called watch bog timer, which supervises the interval from the time when the operational command outputs to the time of the signal representing the completion of the operation, and outputs the time-over signal when the period is over a predetermined value.

At the first step 307 of the diagnostic analysis for the control logic, the latest statuses of the operational commands and the signal representing the completion of the operation are transferred from a PC to the diagnostic system through the telecommunication line 220.

Note, because this step is performed to increase the accuracy of the diagnostic analysis, this step may be deleted.

At step 308, the control logic is also transferred from a PC to the diagnostic system through the telecommunication line 220.

At step 309, the starting address for the diagnostic analysis is determined based on the method precisely described hereinafter.

At step 310, the control logic after the starting address is equivalently modified to the logic represented only by the external contacts arranged on the controlled object.

At step 311, the address where the retardation has occurred is identified, and the diagnostic result is output on the output means 140, for example, a printer.

Figure 4:
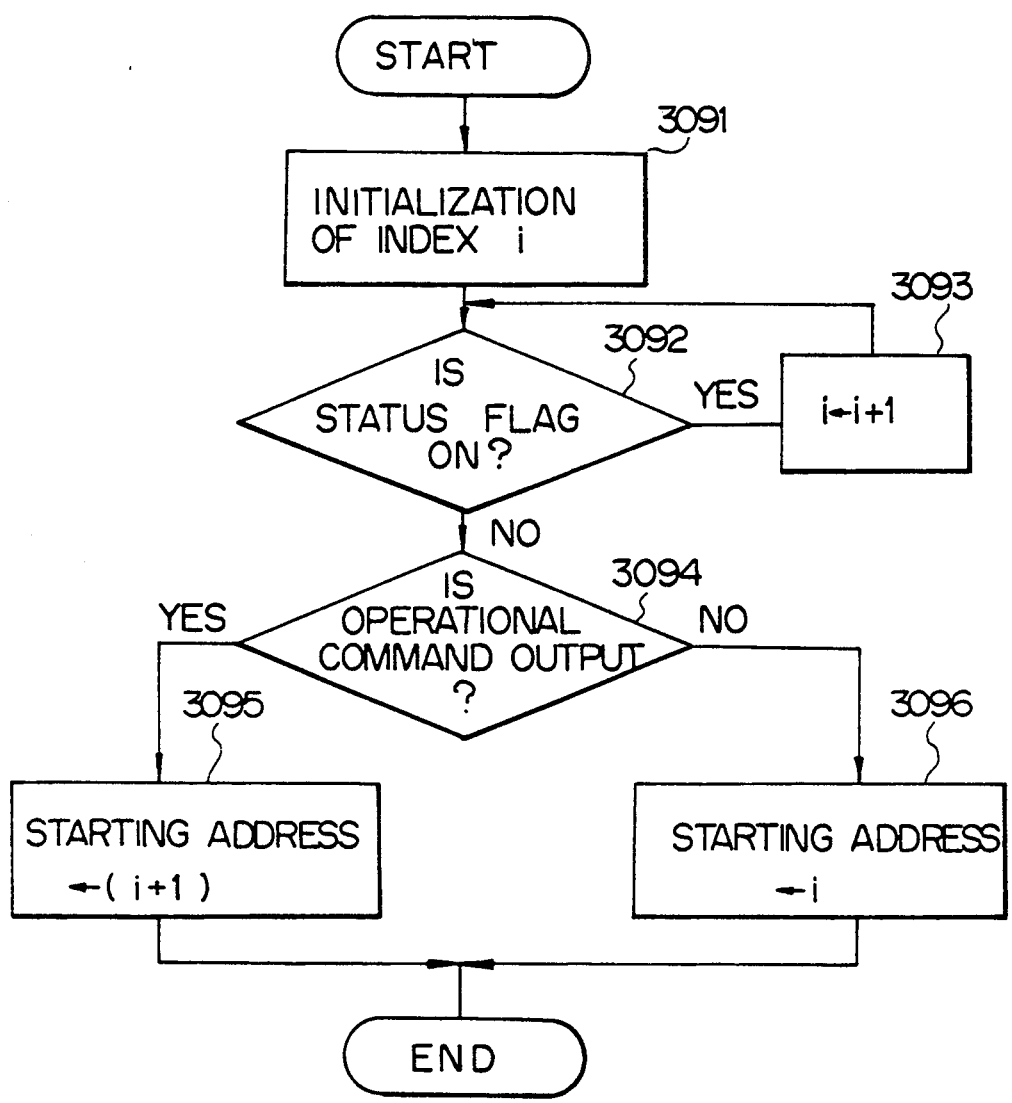
FIG. 4 is a flow chart showing the determination of the starting address for diagnosis.

FIG. 4 shows the detailed process of determining the starting address for the diagnostic analysis.

At step 3091, an index "i" representing the step number is initialized, and at step 3092, it is determined whether the status flag corresponding to the index "i" is set or not by referring to the data stored in the memory means 250.

If the status flag is set, the index "i" is incremented at step 3093, and the control returns to step 3902, which means that the first address, where the status flag is not set, is found.

Note, diagnostic analysis is not required for the control logic corresponding to the address where the status flag is set.

When the first address where the status flag is not set, at step 3094, it is determined whether the operational command corresponding to the first address has already been output or not.

If the operational command has already been output, at step 3095, the starting address for diagnostic analysis is determined as "i+1".

If the operational command has not yet been output, at step 3096, the starting address for diagnostic analysis is determined as "i".

FIG. 5 shows the detailed process for equivalent modification of the control logic.

At step 3101, the control logic corresponding to the starting address is found, and at 3102, the normal contacts, that is closed "a" contacts and opened "b" contacts, are deleted from the control logic.

At step 3103, the control logic is developed in the form without OR logic as described hereinafter.

At step 3104, the self-hold logic is deleted from the control logic, because this logic consists of only internal contacts programmed in the PC, and diagnostic analysis for this logic is not required.

At step 3105, it is determined whether this modified logic has only external contacts or not by checking the address of each contact.

In general, the addresses are divided into three groups, and the first group is to input the signals representing the completion of the operation, the second group is to output the operational command and the third group is for internal auxiliary contacts.

For example, the addresses are assigned as follows.

The first group: 0000~0777
The second group: 1000~1777
The third group: 2000~3777

By repeating step 3101 to step 3104 until the contact addresses are under the predetermined value, for example 1777, the modification is completed, and the control proceeds to step 3106.

At step 3106, it is recognized that the remaining addresses represent the addresses where retardation occurs, and the diagnostic result is displayed on the output means 140.

FIG. 6 and FIG. 7 show one example of the equivalent modification illustrated FIG. 5.

FIG. 6(a) is a control logic corresponding to the starting address.

This control logic is modified as FIG. 6(b) in deleting the contact (0001) that functions normally.

Note, the other contacts do not function normally, that is "a" contacts (0000, 0002, 2000) keep ON-states and "b" contact (0001) maintains an OFF-state. And contact (1000) remains because this contact uses self-hold logic.

The control logic shown in FIG. 6(b) is developed in the form without OR logic.

The control logic shown in FIG. 6(b) represents the following by logical expression.

$$C(1000) = X(2000) \cdot [X(0000) + \overline{X(0001)} \cdot \{X(0002) + X(1000)\}]$$

where C(1000) designates whether or not the coil of Relay (1000) is energized.
X(0000) designates whether or not the "a" contact of Relay (0000) is ON.
$\overline{X(0001)}$ designates whether or not the "b" contact of Relay (0001) is OFF.

This logical expression can be modified as following.

$$\begin{aligned} C(1000) = &\ X(2000) \cdot X(0000) + \\ &\ X(2000) \cdot X(0001) \cdot X(0002) + \\ &\ X(2000) \cdot X(0001) \cdot X(1000) \end{aligned}$$

This modified logical expression is shown in FIG. 6(c). So the control logic shown in FIG. 6(b) is equivalent to the control logic shown in FIG. 6(c).

The control logic shown in FIG. 6(c) is modified to the control logic shown in FIG. 6(d) by deleting the self hold logic.

In FIG. 6(d), because the contact (2000) is determined as the auxiliary contact programmed in a PC by checking the address, the control logic including the contact (2000) is modified.

For example, the control logic including the contact (2000) is shown in FIG. 7(a) and "b" contact (0011) and "a" contact (0010) is OFF.

The control logic shown in FIG. 7(a) is modified to the logic shown in FIG. 7(b).

After this modification is performed, all auxiliary contacts are deleted from the control logic.

As a result, the final control logic shown in FIG. 7(c) is obtained by combining the control logic shown in FIG. 6(d) and FIG. 7(b). And it is determined that "a" contacts (0000,0002,0010) and "b" contact (0001) are abnormal, and the diagnostic result is displayed on the output means 140.

In the above embodiment, the control logic is shown as a so-called ladder sequence, but the present invention can be applied with the control logic shown as a logical expression or logical symbol.

And if the address assignment for output contacts, input contacts and auxiliary contacts are stored in the memory means 150 such as an IC card, great flexibility can be provided for the modification of the control logic programmed in a PC.

We claim:

1. A method of diagnosing a programmable controller with a diagnostic system having a telecommunication line for connecting to said programmable controller, input means for commanding operations, output means for outputting diagnostic results, and memory means for storing information sent from said programmable controller through said telecommunication line, comprising the steps of:

storing one set of output addresses assigned to output ports of said programmable controller from which one series of operational commands for sequentially controlling at least one controlled object is applied to said at least one controlled object, one set of input addresses assigned to input ports of said programmable controller to which one set of feedback signals corresponding to said one series of operational commands is fed back from said at least one controlled object, and status flags each of which is set, respectively, when each signal of said one set of feedback signals is received by said programmable controller;

determining whether or not retardations occur in said at least one controlled object by checking whether or not all of said status flags are set;

transferring said status flags and control logic programmed in said programmable controller from said programmable controller when it is determined that retardation occurs at said determining step; and identifying an address where a status flag is not set as an address where retardation occurs.

2. A method as set forth claim 1, wherein said determining step comprises the substep of:

determining whether or not retardations occur in said at least one controlled object, and determining whether retardations occur when a command is input by an operator of said at least one controlled object through said input means.

3. A method as set forth claim 1, wherein said determining step comprises the substep of:

determining whether or not retardations occur in said at least one controlled object, and determining whether retardations occur when a period, from a time when an operational command is output, to a time when a signal representing a completion of a operation corresponding to said operational command, becomes longer than a predetermined period.

4. A method as set forth claim 1, wherein said transferring step comprises the substep of:

transferring operational commands and signals representing completions of operations corresponding to said operational commands with said control logics.

5. A method of diagnosing a programmable controller with a diagnostic system having a telecommunication line for connecting to said programmable controller, input means for commanding operations, output means for outputting diagnostic results, and memory means for storing data, comprising the steps of:

storing output addresses assigned to output ports of said programmable controller from which operational commands for sequentially controlling at least one controlled object are applied to said at least one controlled object, and input addresses assigned to input ports of said programmable controller to which signals representing completion of operations are applied from said at least one controlled object;

determining whether or not signals representing the completion of operations are applied from said at least one controlled object;

storing status flags in said memory means when it is determined that said signals representing the completion of operations are applied;

determining whether or not one series of sequential control is completed;

resetting data stored in said memory means when it is determined that said one series of sequential control is completed;

determining whether or not retardations occur in said at least one controlled object;

transferring control logic, operational commands and signals representing the completion of operations corresponding to said operational commands from said programmable controller when it is determined that said one series of sequential control is completed;

determining a starting address for analyzing said control logic to identify addresses where retardations occur;

equivalently modifying a part of said control logic behind said starting address to a form including only external contacts arranged on said at least one controlled object; and identifying addresses in said control logic where retardations occur in said control logic based on said status flags.

6. An apparatus for diagnosing a programmable controller comprising:

means for storing one set of output addresses assigned to output ports of said programmable controller from which one series of operational commands for sequentially controlling at least one controlled object is applied to said at least one controlled object, one set of input addresses assigned to input ports of said programmable controller to which one set of feedback signals corresponding to said one series of operational commands is fed back from said at least one controlled object, and status flags each of which is set, respectively, when each signal of said one set of feedback signals is received by said programmable controller;

means for determining whether or not retardations occur in said at least one controlled object by checking whether or not all of said status flags are set;

means for transferring said status flags and control logic programmed in said programmable controller from said programmable controller when it is determined that retardation occurs at said determining step; and means for identifying an address where a status flag is not set as an address where retardation occurs.

7. An apparatus as set forth claim 6, wherein said determining means comprises:

means for determining whether or not retardations occur in said at least one controlled object; and determining retardations occur when a command is input by an operator of said at least one controlled object through an input means.

8. An apparatus as set forth claim 6, wherein said determining means comprises:

means for determining whether or not retardations occur in said at least one controlled object; and determining retardations occur when a period from a time when an operational command is output to a time when a signal representing a completion of an operation corresponding to said operational command is longer than a predetermined period.

9. An apparatus as set forth in claim 6, wherein said transferring means comprises:

means for transferring operational commands and signals representing completions of operations corresponding to said operational commands with said control logics.

10. An apparatus for diagnosing a programmable controller comprising:

memory means for storing output addresses assigned to output ports of said programmable controller from which operational commands for sequentially controlling at least one controlled object are applied to said at least one controlled object, and input addresses assigned to input ports of said programmable controller to which signals representing completion of operations are applied from said at least one controlled object;

means for determining whether or not signals representing the completion of operations are applied from said at least one controlled object;

means for storing status flags in said memory means when it is determined that said signals representing the completion of operations are applied;

means for determining whether or not one series of sequential control is completed;

means for resetting data stored in said memory means when it is determined that said one series of sequential control is completed;

means for determining whether or not retardations occur in said at least one controlled object;

means for transferring control logic, operational commands and signals representing the completion of operations corresponding to said operational commands from said programmable controller when it is determined that said one series of sequential control is completed;

means for determining a starting address for analyzing said control logic to identify addresses where retardations occur;

means for equivalently modifying a part of said control logic behind said starting address to a form including only external contacts arranged on said at least one controlled object; and means for identifying addresses in said control logic where retardations occur in said control logic based on said status flags.

* * * * *